US008694489B1

(12) United States Patent
Yuksel et al.

(10) Patent No.: US 8,694,489 B1
(45) Date of Patent: Apr. 8, 2014

(54) MAP SPAM DETECTION

(75) Inventors: Baris Yuksel, New York, NY (US); Ashutosh Kulshreshtha, Cupertino, CA (US)

(73) Assignee: Google Inc., Mountain View, CA (US)

( * ) Notice: Subject to any disclaimer, the term of this patent is extended or adjusted under 35 U.S.C. 154(b) by 409 days.

(21) Appl. No.: 12/896,240

(22) Filed: Oct. 1, 2010

(51) Int. Cl.
  *G06F 7/00* (2006.01)
  *G06F 17/30* (2006.01)

(52) U.S. Cl.
  USPC ............................................. 707/722

(58) Field of Classification Search
  None
  See application file for complete search history.

(56) References Cited

U.S. PATENT DOCUMENTS

| | | | |
|---|---|---|---|
| 5,636,117 A * | 6/1997 | Rothstein | 705/4 |
| 6,523,021 B1 * | 2/2003 | Monberg et al. | 1/1 |
| 7,373,246 B2 * | 5/2008 | O'Clair | 701/532 |
| 7,873,635 B2 * | 1/2011 | Wang et al. | 707/735 |
| 2004/0030689 A1 * | 2/2004 | Anderson et al. | 707/3 |
| 2006/0271531 A1 * | 11/2006 | O'Clair et al. | 707/5 |
| 2008/0015928 A1 * | 1/2008 | Chandra | 705/10 |
| 2008/0256044 A1 * | 10/2008 | Anderson et al. | 707/3 |
| 2009/0089149 A1 * | 4/2009 | Lerner et al. | 705/10 |
| 2009/0271307 A1 * | 10/2009 | Brock, Sr. | 705/35 |
| 2010/0161498 A1 * | 6/2010 | Walker et al. | 705/306 |
| 2011/0320120 A1 * | 12/2011 | Tielens | 701/207 |

* cited by examiner

*Primary Examiner* — Azam Cheema
(74) *Attorney, Agent, or Firm* — Lerner, David, Littenberg, Krumholz & Mentlik, LLP (57) ABSTRACT

A determination of whether a mapped business listing that is produced as a search result corresponds to an actual location of operation is based on different factors. One factor identifies whether the business listing is associated with a business category that appears as search results for a particular geographic area in numbers that exceed average proportions for the same business category density in similarly situated geographic areas. Another factor determines whether different business listings in the same geographic area include the same identifying data. Specific characteristics of a neighborhood where the business listing is mapped provide an additional factor for identifying whether a search result for a business listing is map spam. The different factors may be considered together to determine the likelihood that a mapped search result is spam.

21 Claims, 4 Drawing Sheets

MAP SPAM DETECTION

BACKGROUND OF THE INVENTION

Various network-based search applications allow a user to enter search terms and receive a list of search results. Such applications commonly use ranking algorithms to ensure that the search results are relevant to the user's query. For example, some systems rank such results based on reliability and safety of the search result, location of the user and search result, etc. These services may also provide business listings in response to a particular search query.

The business listing search results, or data identifying a business, its contact information, web site address, and other associated content, may be displayed on a map such that a user may easily identify which businesses are located within a particular area. In an attempt to generate more customers, some businesses may employ methods to include multiple listings in different geographic locations where the business does not actually exist. The customer may be defrauded by contacting an entity believed to be located nearby only to learn later that the business is actually operating from a completely different location. Such fraudulent marketing tactics are commonly referred to as "map spam".

BRIEF SUMMARY OF THE INVENTION

Aspects of the invention relate generally to map spam detection. A search entity may determine the likelihood that a business listing search result corresponds to a business that seeks to lure potential customers by assigning a location to the listing where the business does not actually operate. The search entity may determine the likelihood that the business listing is map spam by executing a process that weighs different factors. The factors may be considered with reference to a particular geographic region.

One factor to be considered when identifying map spam is whether the business listing is associated with a business category that appears as search results for a particular geographic area in amounts that exceed average proportions for the same business category density in similarly situated geographic areas. Most service-based businesses usually operate within a limited geographic area. When such businesses seek to lure potential customers using map spam, they may fraudulently indicate that their business is located at several different locations within an area when, in fact, they are operating out of a smaller number of sites that may not be located in the same area. Given an average density for business categories in geographic regions having similar characteristics (e.g., an average of ten business listings for plumbers in towns having a population between 75,000-100,000 people), this type of map spam creates a disproportionate number of business listings for an area. Accordingly, it is likely that at least one of the businesses within the category is generating map spam.

Another factor to consider when identifying map spam is whether different business listings in the same geographic area include the same identifying data. Each business listing may include identifying data such as a title, a telephone number and a web site address. If different business listings include the same identifying data, it is likely that the listing is map spam. For example, a search for an event planner in a particular town may produce four different mapped results. If three of the event planner listings include the same title, phone number and/or web site, there is a high likelihood that these event planner listings are map spam.

Specific neighborhood characteristics provide an additional factor for identifying whether a mapped search result for a business listing is spam. For example, if a particular listing corresponds to an address that is located in an area that is zoned for residential use, the likelihood that the business listing is map spam is increased. Similarly, if the listing address can be mapped to a commercially zoned location, the likelihood that the listing is map spam is decreased. In another example, if a listing corresponds to an address located near a particularly well-known location, such as a popular tourist attraction, the likelihood that the business listing is map spam is increased.

In one aspect, a computer-implemented method comprises accessing, by a processor, data corresponding to a geographic region. The processor accesses entries in a searchable group. Each entry includes location data corresponding to the geographic region. The processor determines if an entity corresponding to each entry likely does not exist at a location identified by the location data by identifying whether a criteria exceeds a threshold. Each entry that likely exists at the location identified by the location data is stored in a set of candidates. In response to receiving a request for search results from a client device, the search results that are included in the set of candidates are provided to the client device.

In accordance with some embodiments, each entry corresponds to a business listing and the entity comprises a business identified by the business listing.

In another aspect, a computer-implemented method determines a likelihood that a business listing in a searchable group of entries maps to a location where a business associated with the business listing is operable. The method includes accessing, by a processor, data corresponding to a geographic region. In response to a search of the searchable group, the processor accesses business listings in a searchable group. Each business listing includes location data that identifies a location within the geographic region. The processor determines a likelihood that each business listing corresponds to a business that exists at the location. The likelihood corresponds to a value associated with each business listing. a business listing that is associated with a value that exceeds a threshold is identified as spam.

DETAILED DESCRIPTION

Figure 1:
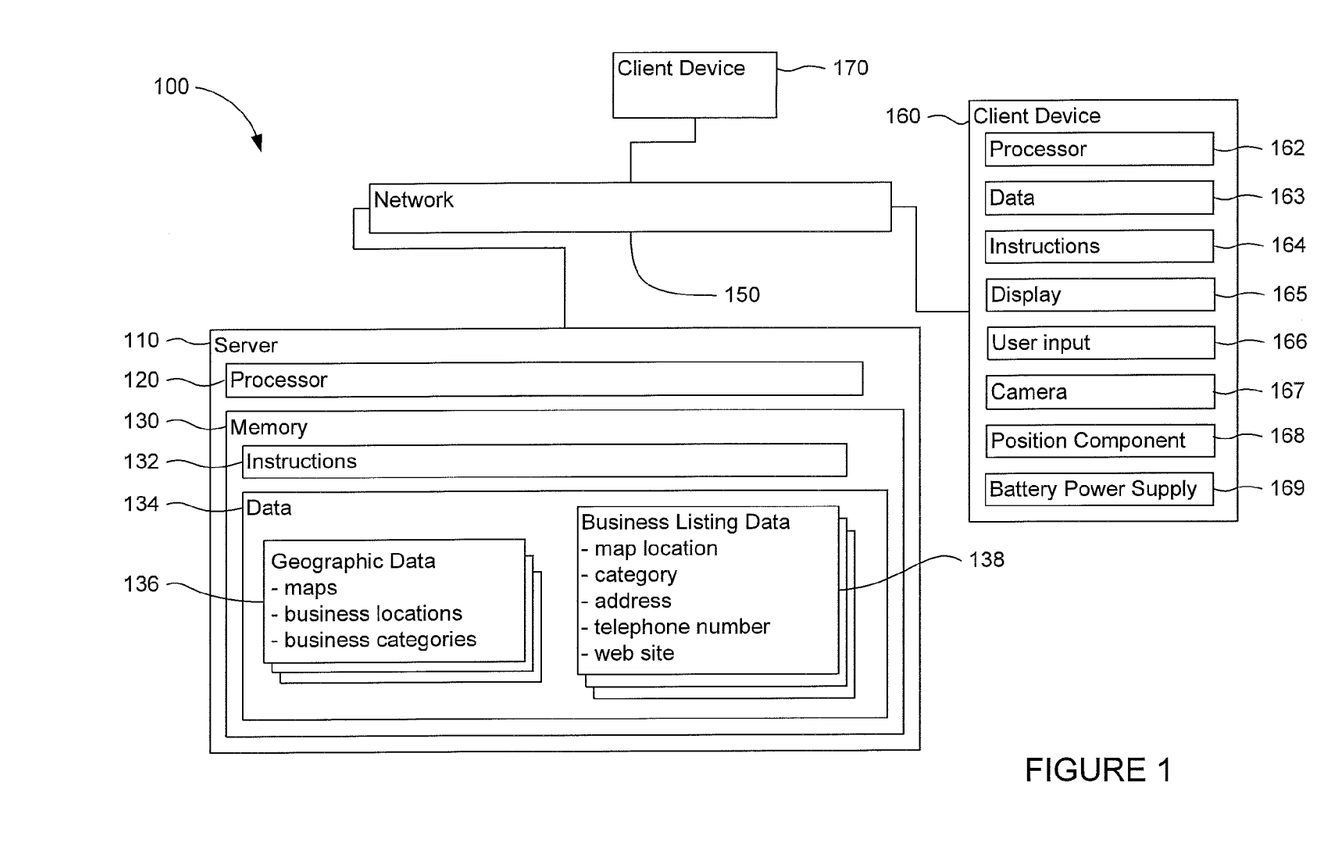
FIG. 1 is a functional diagram of a system in accordance with an aspect of the invention.
Figure 2:
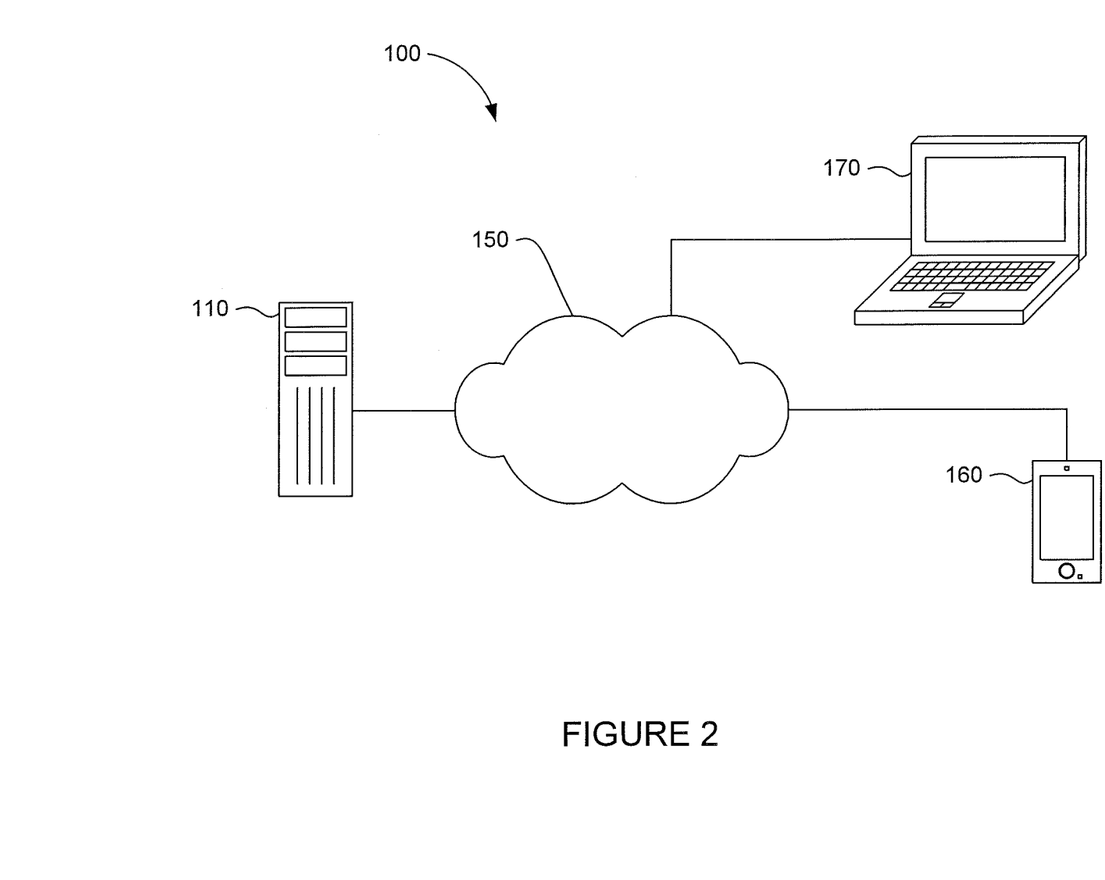
FIG. 2 is a pictorial diagram of a system in accordance with an aspect of the invention.

As shown in FIGS. 1-2, a system 100 in accordance with one aspect of the invention includes a computer 110 containing a processor 120, memory 130 and other components typically present in general purpose computers.

The memory 130 stores information accessible by processor 120, including instructions 132, and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, flash drive, ROM, RAM, DVD or other optical disks, as well as other write-capable and read-only memories.

In that regard, memory may include short term or temporary storage as well as long term or persistent storage. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the architecture is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless or lossy, and bitmap or vector-based, as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor or computer will be understood to include references to a collection of processors or computers or memories that may or may not operate in parallel.

The computer 110 may be at one node of a network 150 and capable of directly and indirectly receiving data from other nodes of the network. For example, computer 110 may comprise a web server that is capable of receiving data from client devices 160 and 170 via network 150 such that server 110 uses network 150 to transmit and display information to a user on display 165 of client device 170. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

Network 150, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device may be configured similarly to the server 110, with a processor, memory and instructions as described above. Each client device 160 or 170 may be a personal computer intended for use by a person 191-192, and have all of the components normally used in connection with a personal computer such as a central processing unit (CPU) 162, memory (e.g., RAM and internal hard drives) storing data 163 and instructions 164, an electronic display 165 (e.g., a monitor having a screen, a touch-screen, a projector, a television, a computer printer or any other electrical device that is operable to display information), end user input 166 (e.g., a mouse, keyboard, touch-screen or microphone). The client device may also include a camera 167, geographical position component 168, accelerometer, speakers, a network interface device, a battery power supply 169 or other power source, and all of the components used for connecting these elements to one another.

The geographical position component 168 may be used to determine the geographic location and orientation of the client device. For example, client device 170 may include a GPS receiver to determine the device's latitude, longitude and altitude. Thus, as the client device changes locations, for example by being physically moved, the GPS receiver may determine a new current location. The component 168 may also comprise software for determining the position of the device based on other signals received at the client device 170, such as signals received at a cellular phone's antennas from one or more cellular phone towers if the client device is a cellular phone.

Although the client devices 160 and 170 may each comprise a full-sized personal computer, they may alternatively comprise mobile devices capable of wirelessly exchanging data, including position information derived from position component 168, with a server over a network such as the Internet. By way of example only, client device 160 may be a wireless-enabled PDA or a cellular phone capable of obtaining information via the Internet. The user may input information using a small keyboard (in the case of a Blackberry-type phone), a keypad (in the case of a typical cellular phone) or a touch screen (in the case of a PDA).

Data 134 of server 110 may include geographic data 136 and business listing data 138. The geographic data 136 may include map data that identifies any type of information that may be useful to identify specific characteristics of a region. For example, the map data may include specific location information such as block, street, neighborhood, town, zip code, city, county, district, state, province, country, and global data. The map data may also include zoning information that identifies whether any particular region is residential, commercial, or zoned for mixed-use. The map data may further include information that identifies where a particular region is rural, suburban, urban, or uninhabitable. Other examples of the map data may include population data for a region including total population and population density information, climate statistics particular to a region, and locations of well-known sites of interest such as tourist attractions and natural wonders.

The geographic data 136 may also include information regarding geographic locations of businesses. Typically, the location of any business is identified by address. However, the location of a business may be identified in other ways such as by latitude and longitude coordinates. The business listings may also be grouped in any number of ways such as by geographic location or category of business. Such groupings are helpful especially considering the large number of businesses that may exist in any particular region or in any particular industry. In one example, businesses may be grouped in accordance with which businesses are located in any particular neighborhood, town, zip code, city, county, or any other district within a geographic boundary or region. In another example, businesses may be grouped based on which businesses are operating within the same industry. The industry may be broadly defined (e.g., restaurants, retail outlets, home repair services, legal services, etc.) or narrowly defined (e.g., Mexican restaurants, camera shops, luxury or used car dealerships, locksmiths, plumbers, electricians, personal injury attorneys, etc.)

The business listing data 138 includes data that identifies a particular business at a specific location. The business listing data 138 may identify the location of the business listing on a map and a category in which the business listing may be included. The business listing data 138 may also include a title for the business and contact information such as a physical address, a telephone number, and a web site address. In some embodiments, the business listing data 138 identifies whether the business operates as a local business, a regional business, a national business or an international business.

In addition to the operations described below and illustrated in the figures, various operations in accordance with aspects of the invention will now be described. It should also be understood that the following operations do not have to be performed in the precise order described below. Rather, various steps can be handled in a different order or simultaneously.

Figure 3:
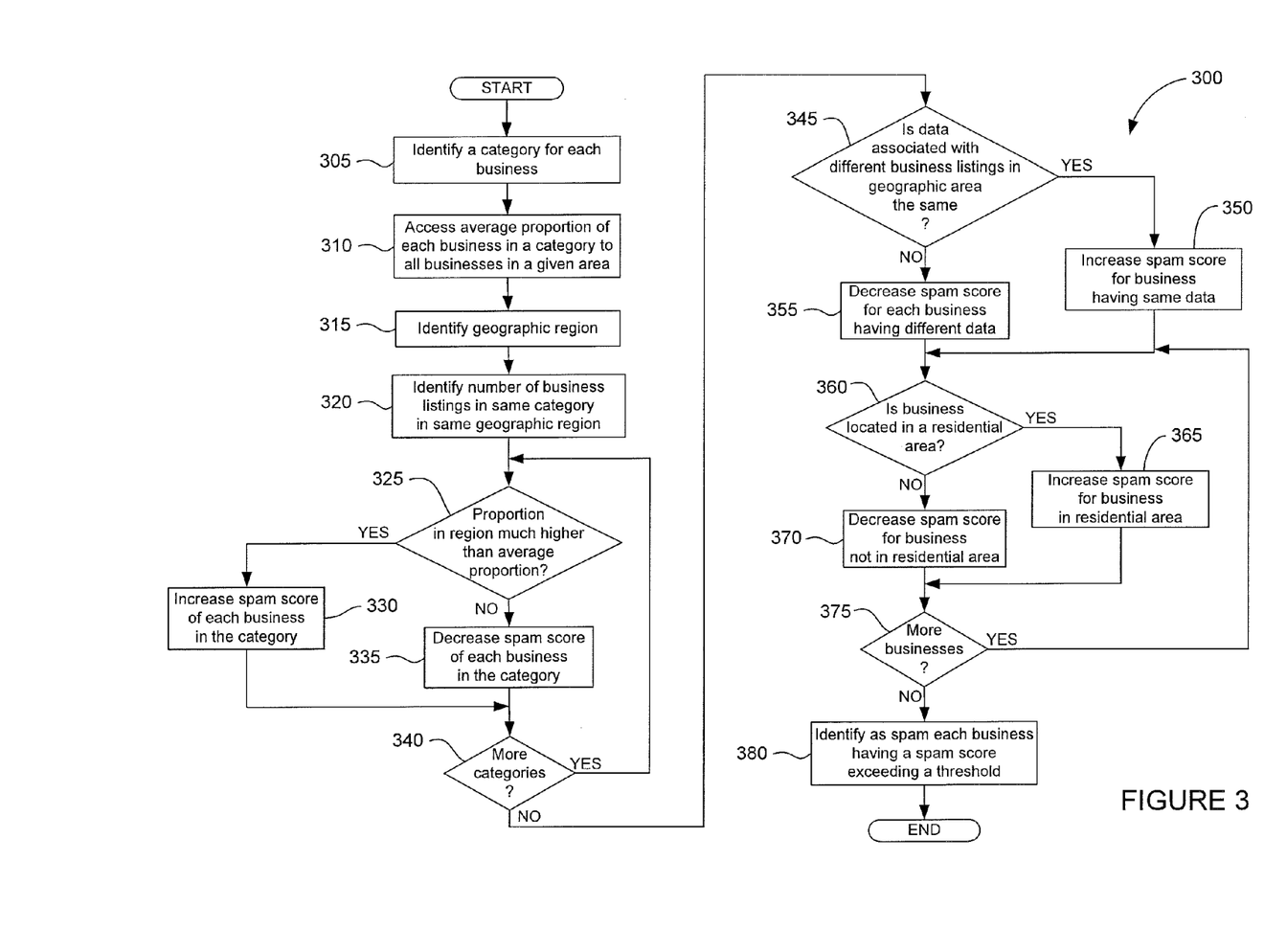
FIG. 3 is an exemplary flow diagram in accordance with aspects of the invention.

FIG. 3 demonstrates a process 300 of determining a likelihood of whether a business listing provided in response to a search is identified by a location where the business is actually operating. In other words, the process 300 detects the likelihood of whether a particular business is attempting to defraud potential customers by generating map spam.

Each business listing is associated with at least one particular business category that identifies the type of industry that the business is operating within (step 305). In some cases, the business listing categories may be identified by a business entity. For example, a business owner may submit a listing to an entity that operates a search engine. The business listing may include a name of the business (e.g., "Apex Nursery and Garden Supply"), an address, a telephone number and (if applicable) a web site address. The business entity may also identify specific business categories (e.g., landscaping products, garden supplies, etc.). In some cases, the business listing may be associated with a particular category or categories after the business listing is submitted by the business entity. For example, the search entity may assign additional categories to the nursery business (e.g., florist, landscaping services, etc.). The geographic data 136 stored on the server 110 may identify the business category for every searchable business listing entry.

Using the different business listings in any particular category, an average proportion of the type of business relative to all businesses in different geographic regions may be determined and subsequently accessed (step 310). The business categories may be broadly or narrowly defined. Similarly, the geographic regions may each cover a large area of land (e.g., a county including a populous city) or a relatively small district (e.g., a neighborhood occupying a few city blocks). This information may be accessed to determine the average density of a particular business category in different geographic regions. In some embodiments, the different geographic regions have similar characteristics. Accordingly, the average density of particular business categories may be determined in similarly situated geographic regions.

In one illustrative example, by accessing the geographic data 136 from the server 110, a number of locksmiths can be identified in a particular zip code (e.g., five), and the total number of business listings in the zip code may also be identified (e.g., eight thousand). Accordingly, the density of locksmiths in the zip code would be 0.0625%. After determining the density of locksmiths in any number of different zip codes in, for example, the same state, an average density may be identified. By way of example, the average density of locksmiths in a particular state may be determined to be 0.05%.

The average density of each business category may be further categorized according to regional characteristics. For example, the average density of each business category in different urban neighborhoods may be categorized separately from the same business category density in suburban or rural areas. In this way, business categories can be grouped to reflect that business density may vary widely depending on the characteristics of a region (e.g., livestock veterinary services in rural areas, electricians in urban areas, landscapers in suburban areas).

The data associated with the average density of a particular business category may be stored as geographic data 136. Similarly, each business listing that may be identified in response to a search result may be stored as business listing data 138 in the server 110. Both the geographic data 136 and the business listing data 138 may be subsequently retrieved to identify which business listings may be attempting to defraud potential customers by providing false operation locations.

The process 300 continues by identifying a geographic region that includes at least one business listing (step 315). A search entity may process each business listing in the identified geographic region to identify which businesses may be defrauding potential customers. The geographic region may be defined in any specific or arbitrary way. For example, the geographic region may be defined as a neighborhood, town, zip code, city, county, area code or local exchange prefix, or metropolitan statistical area vicinage. In another example, the geographic region may be defined as all urban areas within a particular county. The geographic region may be defined using the map data stored on the server 110 as geographic data 136. In one illustrative example, the geographic region may be identified as Union County in New Jersey which has a population of approximately 525,000 residents.

The search entity may execute an algorithm that assigns each business listing a value that corresponds to a likelihood that the business listing is map spam. The value is referred to as a "spam score". In one example, the spam score may be between the values of one and zero, where one strongly identifies the business listing as map spam and where zero strongly identifies the business listing as operating from a valid location. Before the algorithm executes for any given business listing, the spam score may be set at an initial value of 0.5. As one having ordinary skill in the art would appreciate, the spam score may lie within any range of values, and a high spam score may denote a likely valid entry and a low spam score may indicate a strong likelihood that the business listing is map spam.

The algorithm for assigning each business listing with a spam score that identifies the likelihood that the listing is map spam begins by identifying a number of business listings in the geographic region that are assigned to the same category (step 320). For example, the business category may pertain to natural gas suppliers, and it may be determined that there are five natural gas suppliers listed as operating in Union County. In another example, the business category may be residential landscape services, and it may be determined that there are five hundred residential landscape services listed as operating in Union County.

A determination is then made whether the proportion of businesses listed as operating within the geographic region is significantly higher than the average business category density (step 325). The determination of what is regarded as "significantly higher" may be based on a threshold percentage. For example, if the density of business listings in the same category is more than 25%-30% higher than the average business category density, then the proportion for that region may be determined to be significantly higher than the average. The threshold may be higher or lower in accordance with selectable design parameters and the context within which the algorithm is intended to be used.

If the proportion of businesses listed as operating within the geographic region is significantly higher than the average business category density, then there is an increased likelihood that at least some of the business listings may be map spam. In this case, the spam score for each business listing in the corresponding business category is increased (step 330). Referring to the example above, if there are five hundred residential landscape services listed as operating in Union County out of a total of 50,000 business listings, but the average density of residential landscape services that are listed as operating in other similar counties (i.e., similar size, population, and number of business listings; located in the northeastern United States, etc.) is 0.005%, then there is a strong likelihood that at least one of the residential landscape services in Union County is generating map spam.

If the proportion of businesses listed as operating within the geographic region is not significantly higher than the average business category density, then there is a decreased likelihood that any of the business listings may be map spam. In this case, the spam score for the business listings in the corresponding business category is decreased (step 335). Referring to the other example above, if there are five natural gas providers listed as operating in Union County out of a total of 50,000 business listings (e.g., a density of 0.01% for natural gas providers), and the average density of natural gas providers that are listed as operating in other similar counties is 0.009%, then it is unlikely that at any of the natural gas providers in Union County is generating map spam.

The process 300 continues by determining whether other categories of businesses are to be checked for the likelihood that any of the businesses in the category may be generating map spam (step 340). If additional business categories are to be processed by the algorithm, the process 300 returns to step 325; otherwise, the process 300 continues to step 345.

Each business listing may include data representing a title for the business, a telephone number, and a web site. The data that is associated with each business listing may be used to identify the likelihood that the business is generating map spam. Specifically referring to the process 300, a determination is made whether different business listings in the same area are associated with the same business title, the same phone number and/or the same web site. If so, then there is a strong likelihood that this business is generating map spam (step 345).

In some embodiments, a likelihood that business listings in an area that share identifying data are map spam may depend on the number of businesses listings that share the data and a size of the area. For example, if there are twenty different business listings in a two mile radius of an urban area that are associated with "Joe's Plumbing", then there is a strong likelihood that the business named "Joe's Plumbing" is generating map spam. Similarly, if there are two business listings on the same block that are identified as "Joe's Plumbing", then there is a strong likelihood that these listings are map spam. Accordingly, if different business listings in the same area are associated with the same data, the spam score for each business listing is increased (step 350).

In another example, if there is only one business listing in a region encompassing five different towns that includes a web site that is identified as "essexcountydrywall.com", then this business is probably not producing spam. In such cases, the spam score is decreased for each business listing in the same area that does not share data in common with any of the other business listings in the area (step 355).

It is understood that many national or international business listings may include the same identifying data. For example, a pest control service may operate in several different states. In order to consolidate customer inquiries to be processed at a single location, different business listings for different locations where the service is present may include the same identifying data (e.g., the same toll free number and the same web site address). In this case, the process 300 may recognize the business listing as being a national business such that the spam score may not be increased due to different business listings including the same identifying data.

The process 300 continues by determining whether the business listing is located in an area specifically zoned for residential use (step 360). Since it is unlikely that a business would be operating in a residential area, a business listing that purports to be located in a residential area may be generating map spam. In this case, the spam score for the business listing would be increased (step 365). For business listings that include an address that is located within an area that is zoned for commercial use, there is a likelihood that the business is actually operating at the address. Accordingly, the spam score for this business would be decreased (step 370).

In addition to considering whether a neighborhood is zoned for commercial use, other specific neighborhood characteristics may be considered to determine a likelihood that a business listing is map spam. For example, a business may attempt to attract customers by providing a searchable listing near a well-known site of interest, such as a popular tourist destination. Since visitors to such a location may not be familiar with the area, they may be more susceptible to fraudulent business practices. Accordingly, business listings near popular sites of interest may be more likely to be map spam than business listings located in other areas.

The process 300 continues by determining whether other business listings are to be checked for the likelihood that they may be generating map spam (step 375). If additional business listings are to be processed by the algorithm, the process 300 returns to step 360; otherwise, the process 300 proceeds to step 380.

A determination of whether each business listing is likely a result of map spam is made by referencing the final spam score. Specifically, a business listing that is associated with a spam score that exceeds a predetermined threshold is identified as map spam (step 380). Similarly, a business listing that is associated with a spam score that does not exceed a threshold is not identified as being associated with a business that generates map spam. A search entity may have a policy that prevents any business that knowingly and willfully misrepresents itself to potential customers by preventing that business from appearing as a result in any search. In effect, the business that is identified as generating map spam is blacklisted from the search engine. In some cases, the search entity may be satisfied that the business is longer generating map spam and may return the listing to the group of searchable listings.

The process 300 has been described by weighing three different factors that are used to identify the likelihood that a business is engaging in practices aimed at defrauding potential customers. In addition to factors of business category density, shared identifying data and location characteristics, other factors may be taken in consideration to determine the likelihood that a business is generating map spam. As discussed in additional detail below, an accurate determination of whether a business listing is map spam may be difficult based on only one such factor.

It is understood that the spam factor may be increased or decreased by varying amounts depending on specific facts associated with any of the factors. For ease of description, a spam score having a range between zero and one will be used in the examples below. In this case, a spam score of 0.5 is neutral such that the score does not indicate any likelihood of whether the corresponding business listing is spam.

With regard to the business category density factor, in the event that a business category density is between 25%-50% higher than an average density, the spam score may be increased by 0.1. For a business category density of 50%-75% higher than average, the spam score may be increased by 0.2. The spam score may be increased by 0.3 when the business category density more than 75% higher than the average business category density. Similarly, if a business category density is between within an average range of ±10%, the spam score may be decreased by 0.1. For a business category density of 10%-50% less than average, the spam score may be decreased by 0.15. The spam score may be decreased by 0.2 when the business category density more than 50% less than the average business category density.

The varying spam scores may also be applied to business listings that share the same data and are located in the same region. For example, if two business listing share the same title in a geographic region that includes one hundred business listings, the spam score may be increased by 0.1. For thirty business listings that share the same telephone number in an area that includes one thousand five hundred business listings, the spam score may be increased by 0.2. The spam score may be increased by 0.3 when eighty business listings share the same website in a region that includes twenty five hundred business listings.

The varying spam scores may also be applied to business listings that are located in a residential area. For example, if one business listing is located in a residential area, the spam score may be increased by 0.1. In the event that more than two of the same business listings are in a residential area, the spam score may be increased by 0.2. If the business listing is located in a region known to be uninhabited (e.g., on a desert road), the location may have been input with an error.

In some cases the result of processing any particular factor may be inconclusive. For example, a business listing may identify a location in an area that has been zoned for both commercial and residential use. In this case, the spam score is neither increased nor decreased.

Figure 4:
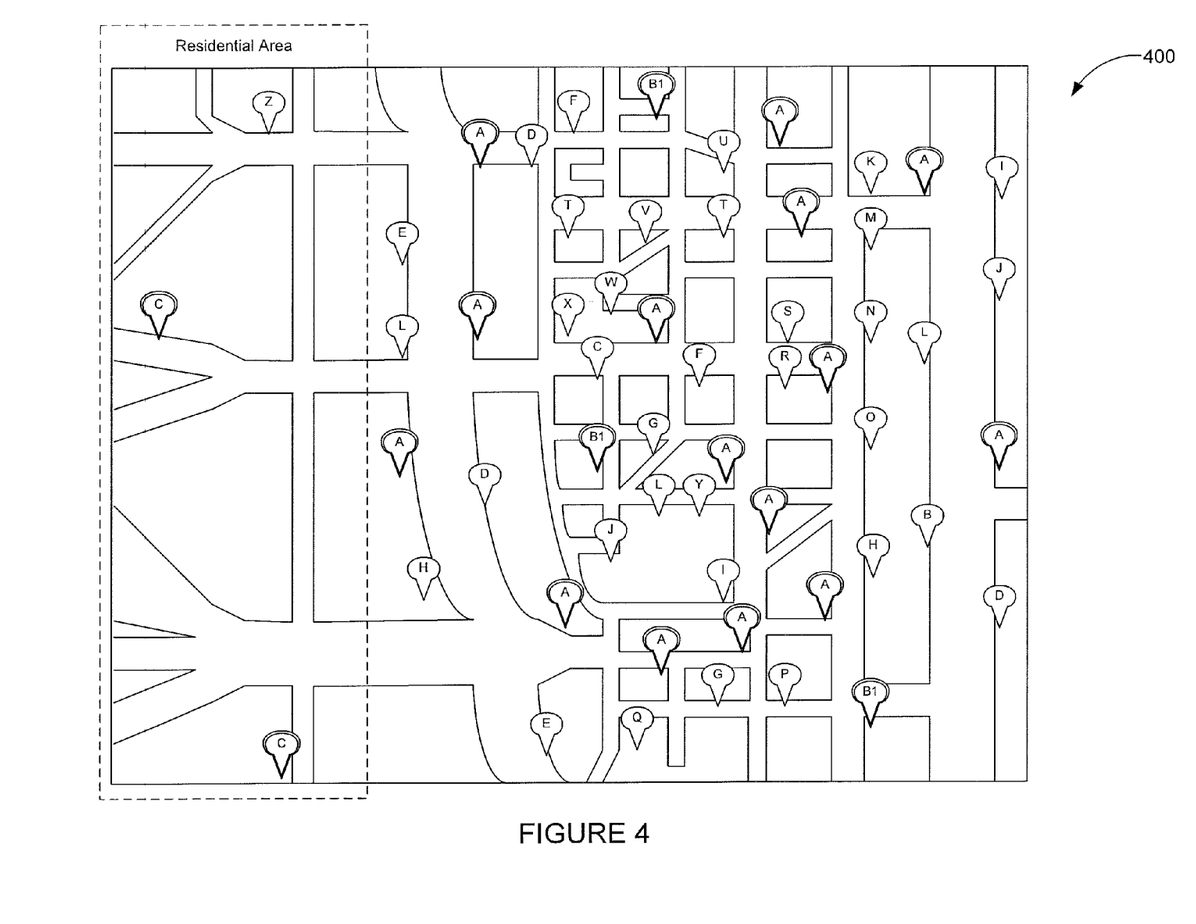
FIG. 4 is an exemplary screen shot in accordance with aspects of the invention.

FIG. 4 illustrates an example screen shot 400 that may be viewed by a user operating a client device that is executing the algorithm to perform the process 300. The screen shot 400 depicts a geographic area illustrated as a map showing several street blocks. Each pin on the map identifies a business listing that may be identified as a result of a search. As shown on the map, there are fifty-six different pins corresponding to fifty-six different business listings.

Map pins that are identified by the same reference letter correspond to business listings in the same category. As shown on the map, fourteen different pins are identified with reference "A". Accordingly, fourteen different business listings are included in the same business category. The map also shows four pins identified as either "B" or "B1" (where B and B1 refer to the same business category); three pins identified for each of the pins labeled with a "C", "D" or "L"; two pins each for those labeled "E", "G", "H", "I", "J" or "T"; and one pin each for the remainder of the identifying reference letters.

A disproportionately high incidence of a particular business category in a given geographic area is one factor to consider when identifying which businesses may be generating map spam. In one illustrative example, the business category identified by reference letter "A" is a private snow removal service and the map depicts a location that receives an average annual snowfall of twenty inches.

In order to determine whether the business listings in category "A" are likely generating map spam, an average incidence of category "A" is determined for similar locations. Since the example business category is snow removal and the map refers to a location having a moderate amount of snowfall each year, locations having a relatively mild winter season (e.g., Tampa, Fla.; Tucson, Ariz.) and locations having a relatively large amount of snowfall (e.g., Anchorage, Ak.; Fargo, N. Dak.) should not be used when calculating an average. Locations that are more useful would have about the same amount of average snowfall (e.g., Boise, Id.; Topeka, Kans.; Philadelphia, Pa.; Springfield, Ill.). Using locations that receive about twenty inches of snow per year, a determination might be made that one in five thousand businesses in such areas are private snow removal services. In other words, the business category density for snow removal services in these areas is 0.02%.

Referring back to FIG. 4, the map indicates that fourteen out of fifty-six business listings are snow removal services, or a business category density of 25%. Since this value significantly exceeds the average business category density for similarly situated locations, it is likely that business listings in this category are generating map spam. Accordingly, each business listing in category "A" is identified as being a potential map spammer. As discussed above with reference to FIG. 3, a potential spammer may be identified by adjusting a spam score associated with the business listing.

As shown on the map, there are two business listings that are included in a category identified by "E". Assuming for description purposes that this category refers to vehicle towing services, the business category density for this location would be 3.5%. Further assuming that the average density of towing companies in similarly situated locations is 3.0%, it is unlikely that either of the business listings identified by category "E" are map spam. Accordingly, a spam score associated with each business listing in category "E" may be adjusted to identify that these entities are unlikely spam entries on the map.

Another factor to consider when identifying a business listing as map spam is whether any business listings are repeated at different locations. Repeated business listings may be determined by shared identifying data. Examples of identifying data may include a title of the business, a telephone number and a web site address.

As shown on the map, business listing "B" and "B1" are in the same category. Business listing "B" is differentiated from the three "B1" listings because the business listing identified as "B" does not share any identifying data as the "B1" entries. As such, it is unlikely that the "B" listing is map spam, and the corresponding spam score is adjusted to reflect the unlikelihood.

Each "B1" business listing includes identifying data that is shared with the other "B1" listings. For example, the "B1" business listing may refer to a business named "Acme Electricians", a telephone number listed as (908)555-1234, and/or a web site identified as "acmeelectricians.com". It is likely that this listing is map spam because it is unlikely that an electrician would have a physical presence at three different locations within ten blocks from each other. Thus, the spam score for each of the three "B1" listings is adjusted to indicate a likelihood that the listings are map spam.

An additional factor to consider when determining if a business listing may be map spam is whether an address of the listing corresponds to a location in an area that is zoned solely for residential use. A shown in FIG. 4, the left portion of the map corresponds to a residential area. Three different business listings are located in this area: two instances of "C" and one instance of "Z". Accordingly, since it is unlikely that a business operates out of a location that is zoned solely for residential use, the three business listings in this are area identified as possibly being map spam. Thus, the corresponding spam scores are adjusted accordingly.

In accordance with some embodiments, the factors for identifying whether a business listing may be spam can be used in conjunction with each other in order to further adjust the corresponding spam score. Assume that business category "C" corresponds to carpet cleaning services and that business category "Z" corresponds to house cleaning services. Since it is unlikely that two carpet cleaning services would operate out of the same residential area especially since there is another carpet cleaning service located in a nearby commercially zoned area, these business listing would be more likely to be map spam. In contrast, it would not be unusual for a house cleaning service to operate out of a person's home, especially considering that no other business in the area provides the same service. In this case, the spam score for business listing "Z" may be adjusted to indicate that it may not be map spam.

A search entity may determine a threshold spam score at which a business listing must exceed in order to be considered as spam. For a spam score between zero and one, a suitable threshold may be 0.7. The search entity identifies all of the business listings that exceed the threshold. These business listings may be removed from the set of searchable listings such that a user of the search engine would not receive map spam from these businesses as search results. Alternatively, the search entity may contact the businesses having spam scores that exceed the threshold to present the business with an opportunity to provide legitimate reasons for why their listings appear to be map spam. If the business is, in fact, generating map spam, the search entity may provide them with an opportunity to rectify the situation by halting their deceptive marketing practices.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A computer-implemented method comprising:
   receiving information identifying a business entity, a category for the business entity, and a location for the business entity in a geographic region;
   accessing, by a processor, data corresponding to the geographic region;
   determining as a first proportion, a number of business entities in the category in the geographic region to a total number of business entities in the geographic region;
   determining as a second proportion, a number of business entities in the category in a different geographic region to a total number of business entities in the different geographic region;
   determining whether the location of the business entity corresponds to an area that is zoned for residential use; and
   increasing a map spam score associated with the business entity if the first proportion is greater than the second proportion, and increasing the map spam score if the location of the business entity corresponds to an area that is zoned for residential use.

2. The method of claim 1, wherein the geographic region and the different geographic region share at least one characteristic.

3. The method of claim 1, further comprising removing the business entity from a repository of business entities if the map spam score is greater than a threshold.

4. A computer-implemented method, comprising:
   receiving information identifying a business entity, a category for the business entity, and a location for the business entity in a geographic region;
   accessing, by a processor, data corresponding to the geographic region;
   determining as a first proportion, a number of business entities in the category in the geographic region to a total number of business entities in the geographic region;
   determining as a second proportion, a number of business entities in the category in a different geographic region to a total number of business entities in the different geographic region;
   determining identifying data for the business entity and identifying data for a plurality of other business entities in the geographic region;
   determining if the identifying data for the business entity matches the identifying data for any of the plurality of other business entities; and
   increasing the map spam score for the business entity if the identifying data for the business entity matches the identifying data for any of the plurality of other business entities in the geographic region and increasing the map spam score if the first proportion is greater than the second proportion.

5. The method of claim 4, wherein the identifying data for the business entity and the plurality of other business entities is selected from the group consisting of: a title, a telephone number and a web site address.

6. The method of claim 4, further comprising removing the business entity from a repository of business entities if the map spam score is greater than a threshold.

7. The method of claim 4, wherein the geographic region and the different geographic region share at least one characteristic.

8. A non-transitory computer readable recording medium storing instructions thereon, the instructions, when executed by a processor, cause the processor to implement a method comprising:

receiving information identifying a business entity, a category for the business entity, and a location for the business entity in a geographic region;

accessing data corresponding to the geographic region;

determining as a first proportion, a number of business entities in the category in the geographic region to a total number of business entities in the geographic region;

determining as a second proportion, a number of business entities in the category in a different geographic region to a total number of business entities in the different geographic region;

determining whether the location of the business entity corresponds to an area that is zoned for residential use; and increasing a map spam score associated with the business entity if the first proportion is greater than the second proportion, and increasing the map spam score if the location of the business entity corresponds to an area that is zoned for residential use.

9. The non-transitory computer readable recording medium of claim 8, wherein the geographic region and the different geographic region share at least one characteristic.

10. The non-transitory computer readable recording medium of claim 8, further comprising removing the business entity from a repository of business entities if the map spam score is greater than a threshold.

11. A non-transitory computer readable recording medium storing instructions thereon, the instructions, when executed by a processor, cause the processor to implement a method comprising:

receiving information identifying a business entity, a category for the business entity, and a location for the business entity in a geographic region;

accessing data corresponding to the geographic region;

determining as a first proportion, a number of business entities in the category in the geographic region to a total number of business entities in the geographic region;

determining as a second proportion, a number of business entities in the category in a different geographic region to a total number of business entities in the different geographic region;

determining identifying data for the business entity and identifying data for a plurality of other business entities in the geographic region;

determining if the identifying data for the business entity matches the identifying data for any of the plurality of other business entities; and increasing the map spam score for the business entity if the identifying data for the business entity matches the identifying data for any of the plurality of other business entities in the geographic region and increasing the map spam score if the first proportion is greater than the second proportion.

12. The non-transitory computer readable recording medium of claim 11, wherein the identifying data for the business entity and the plurality of other business entities is selected from the group consisting of: a title, a telephone number and a web site address.

13. The non-transitory computer readable recording medium of claim 11, further comprising removing the business entity from a repository of business entities if the map spam score is greater than a threshold.

14. The non-transitory computer readable recording medium of claim 11, wherein the geographic region and the different geographic region share at least one characteristic.

15. A device comprising:

memory storing data corresponding to a geographic region; and a processor configured to:

receive information identifying a business entity, a category for the business entity, and a location for the business entity in the geographic region;

access the data corresponding to the geographic region;

determine as a first proportion, a number of business entities in the category in the geographic region to a total number of business entities in the geographic region;

determine as a second proportion, a number of business entities in the category in a different geographic region to a total number of business entities in the different geographic region;

determine whether the location of the business entity corresponds to an area that is zoned for residential use; and increase a map spam score associated with the business entity if the first proportion is greater than the second proportion, and increasing the map spam score if the location of the business entity corresponds to an area that is zoned for residential use.

16. The device of claim 15, wherein the geographic region and the different geographic region share at least one characteristic.

17. The device of claim 15, wherein the processor is further configured to remove the business entity from a repository of business entities if the map spam score is greater than a threshold.

18. A device comprising:

memory storing data corresponding to a geographic region; and a processor configured to:

receive information identifying a business entity, a category for the business entity, and a location for the business entity in the geographic region;

access the data corresponding to the geographic region;

determine as a first proportion, a number of business entities in the category in the geographic region to a total number of business entities in the geographic region;

determine as a second proportion, a number of business entities in the category in a different geographic region to a total number of business entities in the different geographic region;

determine identifying data for the business entity and identifying data for a plurality of other business entities in the geographic region;

determine if the identifying data for the business entity matches the identifying data for any of the plurality of other business entities; and increase the map spam score for the business entity if the identifying data for the business entity matches the identifying data for any of the plurality of other business entities in the geographic region, and increase the map spam score if the first proportion is greater than the second proportion.

19. The device of claim 18, wherein the identifying data for the business entity and the plurality of other business entities is selected from the group consisting of: a title, a telephone number and a web site address.

20. The device of claim 18, wherein the processor is further configured to remove the business entity from a repository of business entities if the map spam score is greater than a threshold.

21. The device of claim 18, wherein the geographic region and the different geographic region share at least one characteristic.

\* \* \* \* \*